United States Patent
Kaegi et al.

[11] Patent Number: 5,510,073
[45] Date of Patent: Apr. 23, 1996

[54] PLANETARY GEAR FOR A MULTIPLE-SCREW EXTRUDER

[75] Inventors: Werner Kaegi, Felsberg; Gerhard Schmidt, Domat/Ems; Joachim Ensinger, Tamins, all of Switzerland

[73] Assignee: Ems-Inventa AG, Zuerich, Switzerland

[21] Appl. No.: 227,106

[22] Filed: Apr. 13, 1994

[30] Foreign Application Priority Data

Apr. 15, 1993 [DE] Germany .......... 43 12 249.3

[51] Int. Cl.$^6$ .............. B01F 7/26; F16H 37/06
[52] U.S. Cl. .............. 264/211.23; 264/102; 264/211.24; 264/349; 366/83; 366/84; 366/91; 422/136; 422/137; 425/203; 425/204; 425/205; 475/331; 475/332
[58] Field of Search .............. 264/211.23, 349, 264/102, 211.24; 366/83, 84, 85, 91; 74/410, 413, 665 F, 665 G, 665 GA, 665 GC, 665 GD, 665 S, 665 N, 665 P, 665 Q; 475/331, 332; 425/203, 204, 205; 422/136, 137

[56] References Cited

U.S. PATENT DOCUMENTS

| | | | |
|---|---|---|---|
| 3,359,826 | 12/1967 | Hanslik | 74/665 GA |
| 3,824,875 | 7/1974 | Willert et al. | 74/665 GA |
| 4,253,345 | 3/1981 | Munster | 74/665 G |
| 4,261,225 | 4/1981 | Zahradnik | 74/665 GA |
| 4,268,176 | 5/1981 | Muller | 366/83 |
| 4,315,440 | 2/1982 | Chszaniecki | 74/665 G |
| 4,586,402 | 5/1986 | Schafer | 475/332 |
| 4,591,487 | 5/1986 | Fritsch | 366/83 |
| 4,644,809 | 2/1987 | Howse | 74/665 GA |
| 5,108,711 | 4/1992 | Chszaniecki | 366/83 |

FOREIGN PATENT DOCUMENTS

| | | |
|---|---|---|
| 0215460 | 3/1987 | European Pat. Off. . |
| 0440888 | 8/1991 | European Pat. Off. . |
| 0588008 | 3/1994 | European Pat. Off. . |
| 1545209 | 6/1978 | Germany . |
| 2726962 | 1/1979 | Germany .......... 264/211.23 |
| 3030541 | 9/1988 | Germany . |
| 4001986 | 9/1991 | Germany . |
| 1-105036 | 4/1989 | Japan . |

*Primary Examiner*—Mathieu D. Vargot
*Attorney, Agent, or Firm*—Spencer & Frank

[57] ABSTRACT

A planetary gear for a multiple-screw extruder includes a circular stationary housing having internal teeth, a sun wheel formed from at least one toothed portion of a spindle, and a plurality of main planet wheels formed from at least one toothed free end of a plurality of screws and arranged in a circle. The plurality of main planet wheels are spaced from one another, from the sun wheel and from the internal housing teeth. A plurality of internal and external intermediate planet wheels are arranged between the sun wheel and the main planet wheels and between the main planet wheels and the internal housing teeth, respectively.

31 Claims, 2 Drawing Sheets

5,510,073

1

PLANETARY GEAR FOR A MULTIPLE-SCREW EXTRUDER

CROSS-REFERENCE TO RELATED APPLICATIONS

The present application claims the right of foreign priority with respect to Application No. P 4 312 249.3 filed in Germany on Apr. 15, 1993, the subject matter which is incorporated herein by reference.

BACKGROUND OF THE INVENTION

1. Field of the Invention

The invention relates to a multiple-screw extruder. In particular, the present invention relates to a multiple-screw extruder with a planetary gear and to a method of processing and treating high-viscosity media using a multiple-screw extruder according to the invention.

2. Description of the Related Art

Conventional apparatuses for the treatment or production of plastics materials in the molten phase are, for example, containers which are arranged vertically or horizontally having stirrer mechanisms, extruders with one or two shafts, or thin-layer apparatuses. In particular at high viscosities, i.e., in the final stage of polymer production, such arrangements have a few known disadvantages, such as poor and irregular flow behavior (broad residence time distribution), settling of product on walls, covers and in dead corners. Additionally, these arrangements suffer from a slow reaction rate, particularly in the case of polycondensation reactions, for example polyester production, because the available surface for liberation of low molecular weight gaseous by-products is small, is inaccessible for a vacuum, or is sparingly renewed.

For the expounded reasons there has been made efforts to overcome the faults of the conventional devices by means of multiple-shaft reactors.

One of the first of these apparatuses is described in DE-PS 15 45 209. This patent discloses a horizontal reactor with several parallel, closely intermeshing, single-start screws which rotate in the same direction and are immersed above an axis in a pool of melt. Although backmixing and settling in the part of the reactor contacted by the melt may be avoided by forced conveyance, the specific surface area of the pool of melt and, therefore, the reaction rate are still small and slow, respectively. Consequently, deposits of desublimated oligomers on the cover cannot be avoided in the vapor chamber of the reactor.

Improvement has been made with a multiple-shaft kneading disc reactor according to DE-PE 30 30 541, in which several axially parallel intermeshing screw shafts with conveying kneading discs are arranged in a circle around a degasification chamber which faces thin films of the polymer melt that are formed on the screws. Stationary shafts are all guided individually through a housing to the gear which, in practice, leads to problems with sealing the reaction chamber if a fine vacuum of up to $10^{-4}$ bar is to be maintained, for example during polyester production. Sealing of this type of reactor is however problematic and demands a correspondingly high expenditure.

Solutions to the sealing problem were subsequently proposed by using only a main driving shaft which is guided through the housing wall and sealed. Such an apparatus is described in EP-OS 0 215 460. This disclosed apparatus is a vertical thin-layer apparatus in which several shafts are

2 caused to roll in a planetary fashion on a stationary central gear-wheel. The shafts perform a revolving movement and a rotational movement in the same direction and spread a film of melt on the internal cylinder wall at high relative velocity. A problem associated with this apparatus resides in the one-sided guidance and low-friction mounting of the shaft ends in perforated discs connected to the driving shaft. The shafts are designed as grooved rods which are spaced at a certain distance from one another. Cleaning is considerably poorer than with meshing screw shafts, and uniform conveying behavior over the cross section, which is a condition for a narrow residence time distribution, is not ensured.

A multiple-screw extruder according to DE-PS 40 01 986 has the same basic features of only one central driving shaft guided from a housing and having circling planetary shafts. By way of a helical-geared central spindle in the gearing, the planet spindles arranged in a circle around the spindle can easily be driven because they are also helical-geared and, therefore, roll on the central spindle and also in the teeth of the internal housing wall. As the central spindle rotates, the planetary shafts consequently perform a rotational and a simultaneous revolving movement on the internal housing wall. Intermeshing screws are provided between the planetary roller portions while the internal housing wall and the central shaft are smooth in the processing section. The geometric conditions of the toothed gearing of this multiple-screw extruder, which are in contrast to the thin layer apparatus described in EP-OS 0 215 460, cause the direction of rotation of the planetary shafts to be contrary to the direction of revolution. This means that the relative velocity of the passing screw webs and, therefore, their conveying effect, are very slight with regard to the internal housing wall and the surface of the rotating central shaft in the processing section. In comparison with the multiple-shaft kneading disc reactor disclosed in DE-PS 30 30 541, this fact is a considerable disadvantage with respect to self-cleaning and uniform conveying behavior. Furthermore, holdup and surface renewal —decisive parameters in diffusion-controlled processes—can only be calculated with difficulty.

SUMMARY OF THE INVENTION

The object of the present invention is to provide a planetary gear for a multiple-screw extruder such that the problems with sealing the processing chamber can be kept to a minimum and so that a high-viscosity medium which is to-be-treated is forcibly conveyed in all points of the processing chamber while experiencing optimum surface renewal.

This and other objects are achieved by the present invention by providing a multiple-screw extruder including a housing having an exterior surface and a circular interior surface with teeth on the interior surface, and a planetary gear having a sun wheel formed on at least one toothed portion of a central spindle and a plurality of main planet wheels arranged in a circle around the sun wheel such that each main planet wheel is formed on at least one end of a screw and is spaced from each other main planet wheel, from the sun wheel and from the teeth on the interior surface of the housing. A plurality of internal intermediate planet wheels are arranged between the sun wheel and the main planet wheels while engaging both the sun wheel and the main planet wheels. A plurality of external intermediate planet wheels is arranged between the main planet wheels and the teeth on the interior surface of the housing and engages both the main planet wheels and the teeth on the interior surface of the housing. Preferably, the number of main planet wheels, the number of internal and the number of external intermediate planet wheels are equal. The sun wheel is preferably driven.

According to the invention, each internal intermediate planet wheel is associated with an opposing external intermediate planet wheel so that a cross sectional center of the sun wheel, a cross sectional center of an internal intermediate planet wheel and a cross sectional center of the external intermediate planet wheel associated with the internal intermediate planet wheel are arranged in a radial line projecting from the cross sectional center of the sun wheel. A plurality of radial lines are formed projecting from the cross sectional center of the sun wheel for each internal intermediate planet wheel and its associated external intermediate planet wheel. A cross sectional center of a main planet wheel is arranged on a line passing through the cross sectional center of the sun wheel which bisects an angle formed between two adjacent radial lines.

The wheels of the planetary gear and the teeth on the interior surface of the housing intermesh both positively and non-positively. Further, the wheels of the planetary gear and the teeth on the interior surface of the housing can be helical-geared to provide an improved mode of operation. If the planetary gears and the teeth on the interior surface of the housing are herringbone geared (double-helical gearing), axial reaction forces are eliminated. Preferably, the wheels of the planetary gear, the internal housing teeth and all end faces of rotating parts of the extruder are lubricated with media extruded by the multiple-screw extruder.

The invention also includes a first processing chamber disposed within the interior of the housing such that the first processing chamber has an inlet end and an outlet end. A cross sectional center of the central spindle is arranged at a cross sectional center of the first processing chamber, and the screws are arranged circularly around the central spindle within the first processing chamber. The invention can further include a second processing chamber disposed within the interior of the housing such that the second processing chamber has an inlet end and an outlet end wherein the inlet end of the second processing chamber is coupled to the outlet end of the first processing chamber. The cross sectional center of the central spindle is also arranged at a cross sectional center of the second processing chamber and the screws arranged circularly around the central spindle within the second processing chamber. It will be appreciated that a multiple-screw extruder constructed in this way can also have several successive mutually communicating processing chambers. Further, the planetary gear may be arranged at the beginning and/or at the end of at least one processing chamber.

The planetary gear according to the present invention is arranged at at least one end of the first processing chamber. Depending upon its configuration, the central spindle can have a smooth surface or be a screw in the first processing chamber. The central spindle and the shaft of each screw are arranged axially in parallel and so adjacent screws intermesh with one another. The spacing between an outer periphery of each of the screws and the interior surface of the housing and the spacing between the outer periphery of each of the screws and a surface of the central spindle are minimized.

The multiple-screw extruder according to the present invention can also include a degasification dome arranged on the processing chamber and a vacuum device coupled to the degasification dome.

In the planetary gear according to the present invention, two additional rings of internal and external intermediate planet wheels are provided so that the teeth of the main planet wheels no longer roll directly on the internal casing teeth or on the sun wheel, but in such a way that each main planet wheel in the planetary gear is arranged between two internal and two external intermediate planet wheels. Thus, driving the central driving shaft or the central spindle leads to a rotation of the screws in the same direction as the direction of revolution of the screws in the extruder so that, particularly in the region between the screws and the internal casing wall on the one hand and the screws and the surface of the central spindle on the other hand, high relative velocities are produced, therefore achieving a conveying effect, good self-cleaning and great surface renewal.

It is particularly advantageous to lubricate the gearwheels of the planetary gear and the internal housing teeth with product. Therefore, the medium to-be-treated in the multiple-screw extruder is either introduced through the gear into the processing chamber or conveyed through the gear from the processing chamber into an outlet section. Between the end faces of the gear-wheels, shafts and housing cover narrow lubricating gaps are formed in which a film of treatment medium prevents direct contact between these parts. This lubricating film is markedly sheared and continuously exchanged.

The central spindle preferably has a smooth surface in the processing chamber. However, a special design consists of a central spindle which is designed as a screw in the processing chamber and meshes with all planet screws. In this case, the present invention provides a compact bundle of screws instead of a purely circular arrangement.

The screws provided for conveying the medium to-be-treated, as well as the central spindle, are preferably arranged axially parallel to one another.

Adjacent screw spindles are designed to mesh with one another. The distances between the outer periphery of the screws and the internal housing face, on the one hand, and the surface of the central spindle, on the other hand, are as small as possible in design. The narrow and very tight contact between the individual parts in the processing chamber, with simultaneous good accessibility for possible vacuum in the open nips, provides the desired optimum properties of the multiple-screw extruder. The multiple-screw extruder basically is suitable for continuous degasification, gasification, mixing or production of, for example, high molecular weight polymers which are in the molten phase.

In the multiple-screw extruder according to the invention, preferably only the central spindle is driven, thus simplifying the driving device and the shaft seal. The driving shaft is preferably only introduced through one of the two end faces of the extruder apparatus.

The multiple-screw extruder with the planetary gear according to the invention is particularly suitable for continuous processing of high-viscosity media, particularly for the treatment of thermoplastic polymer melts or for the production of thermoplastic polymers. During processing, these high-viscosity media are subjected to optimum surface renewal, self-cleaning and a conveying effect in the processing chamber of the multiple-screw extruder on its preferably smooth internal housing wall and on the preferably smooth surface of the central spindle, as well as between the screws.

The present invention also provides a method for continuously processing high-viscosity medium including the steps of applying the high viscosity medium to the inlet end of the first processing chamber, driving the central spindle for translating the main planet wheels around the central spindle and for rotating each main planet wheel about a cross sectional center of the respective main planet wheel, and extruding the high viscosity medium from the outlet end of the processing chamber. The step of driving the central spindle causes the high viscosity medium on an internal housing wall of the processing chamber and on the central spindle is subjected to a high relative velocity. Preferably, the high viscosity medium is one of a thermoplastic polymer melt or a thermoplastic polymer. In the processing chamber, the high-viscosity medium is subjected to shearing, surface renewal and a conveying action on an internal housing wall of the processing chamber, on the central spindle and between the screws. Accordingly, the high-viscosity media are subjected to a high relative velocity on the internal housing wall and on the central spindle.

The method according to the invention also includes the step of degasifying the processing chamber of one of a constituent selected from the group consisting of a volatile constituent, a monomer, an oligomer and a solvent residue. Preferably, the volatile constituent is a cleavage product. Additionally, one of gaseous or liquid component can be introduced to the processing chamber for causing one of chemical or physical changes in the high viscosity medium. The present invention allows for a chemical reaction, a mixing operation or a compounding process to be performed in the processing chamber. Preferably, the chemical change is one of the group consisting of a polymerization, a polycondensation or a polyaddition reaction. The polycondensation reaction preferably involves production of one of the group consisting of a polyester, a polyamide, a polycarbonate, a polyarylate, a polyamine, a polyamideimide, a copolymer of a polyester, a copolymer of a polyamide, a copolymer of a polycarbonate, a copolymer of a polyarylate, and a copolymer of a polyamideimide. Preferably, the polyester is one of the group consisting of polyethylene terephthalate, polybutylene terephythalate, polyethylene napthalate, a copolymer of polyethylene terephthalate, a copolymer of polybutylene terephythalate, and a copolymer of polyethylene napthalate.

Chemical or physical changes may be brought about by introduction of additional gaseous or liquid components into the intake section or into the processing chamber.

BRIEF DESCRIPTION OF THE DRAWINGS

The various objects of the present invention, together with other advantages and benefits which may be attained by its use, will become more apparent in view of the following detailed description of the invention taken in conjunction with the drawings. In the drawings, wherein like reference numerals identify corresponding portions of the various embodiments of the multiple-screw extruder.

DETAILED DESCRIPTION OF THE PREFERRED EMBODIMENTS

Figure 1:
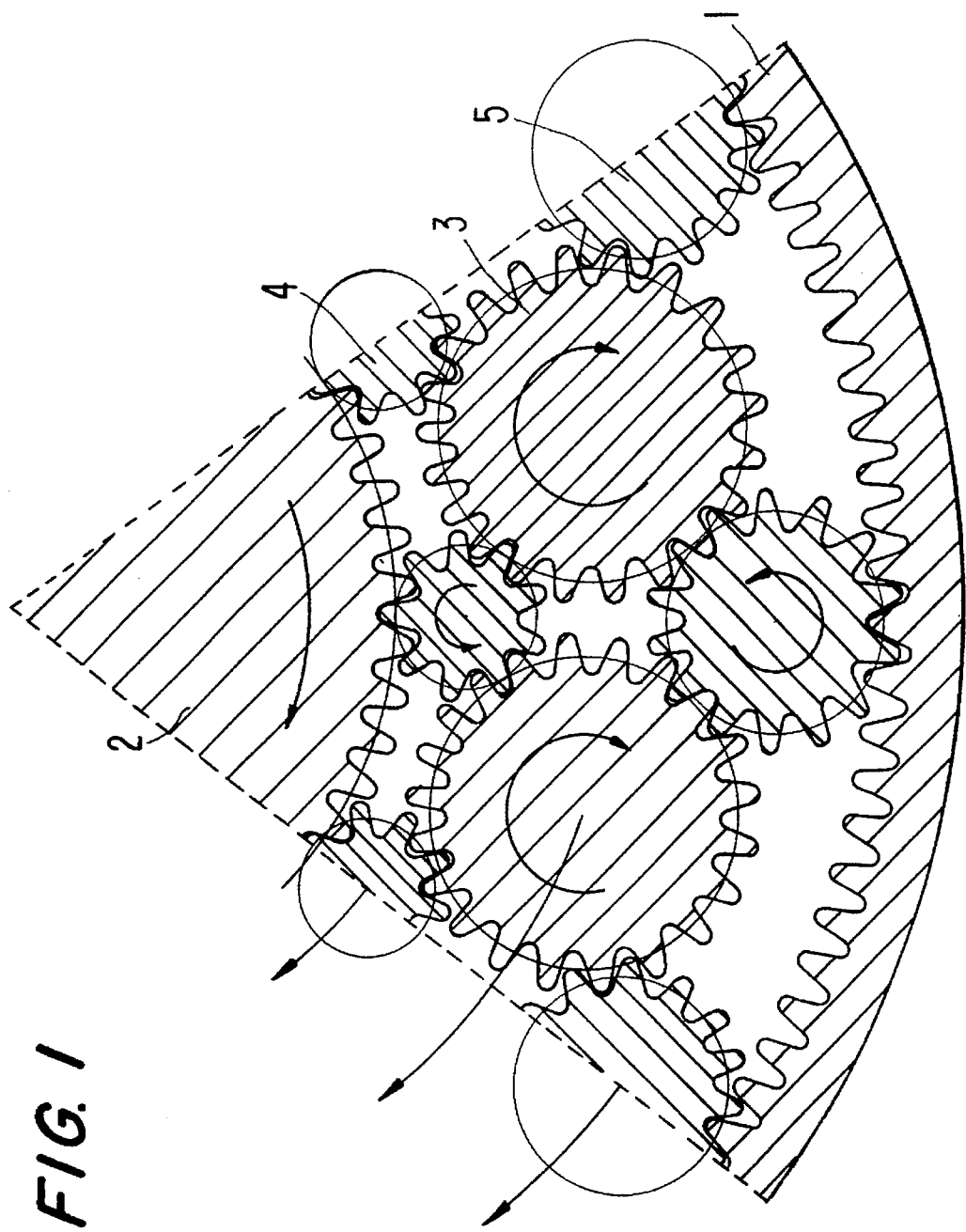
FIG. 1 is a cross sectional view through a sector of the planetary gear according to the invention.
Figure 2:
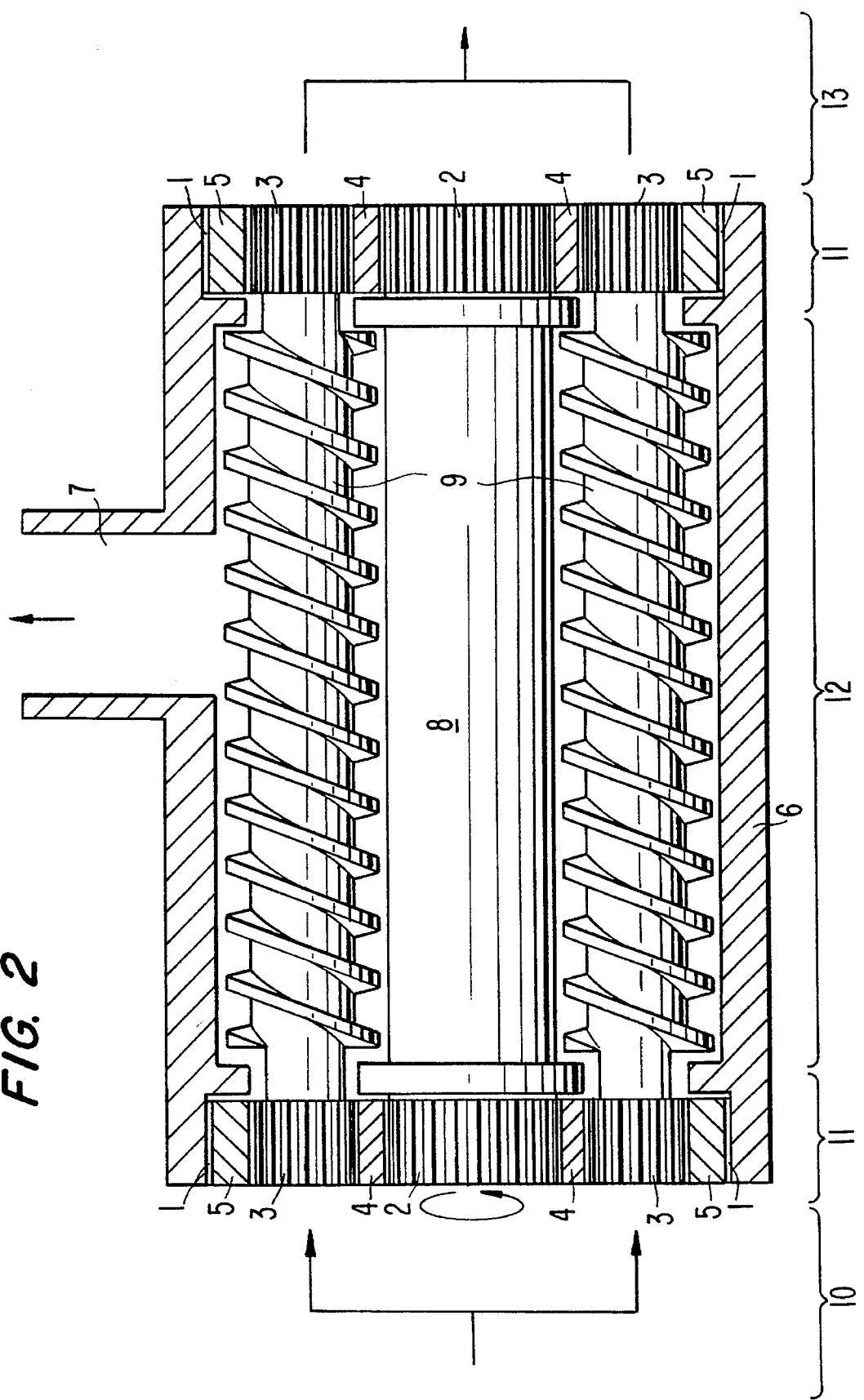
FIG. 2 is a longitudinal sectional view through a multiple-shaft extruder with the planetary gear according to the invention at both ends of the processing chamber.

The configuration and function of the planetary gear according to the invention is shown schematically in FIG. 1 where only one sector of a closed circular configuration of a planetary gear of a multiple-screw extruder is shown. FIG. 2 shows a longitudinal section through a processing chamber 12 of the multiple-screw extruder. The planetary gear according to the invention is arranged at the beginning and at the end of the processing chamber. A melt intake section 10 at one end and a melt outlet section 13 on the other end are not shown in detail, but are merely indicated by reference numerals.

All gear-wheels of the planetary gear, that is, the sun wheel 2, the main planet wheels 3, as well as the internal and external intermediate planet wheels 4 and 5, respectively, are contained by the internal housing teeth 1 of a non-rotatably mounted housing 6. Sun wheel 2 is formed by a toothed portion of a central spindle 8 and is rigidly connected to spindle 8. In a corresponding manner, main planet wheels 3 represent the free ends of screws 9. In the center, the sun wheel 2, like all other gear-wheels 3, 4, 5, is arranged to preferably have helical gearing for conveying the polymer melt passing through the gaps in the gearing, in addition to through the positive and non-positive connection.

The main planet wheels 3 are located between the internal housing teeth 1 and the sun wheel 2, however, the main planet wheels 3 do not engage either the internal housing teeth 1 or the sun wheel 2. Between main planet wheels 3 and sun wheel 2, a ring of internal intermediate planet wheels 4 is inserted into the gear for ensuring that the direction of rotation of the main planet wheels 3, which rotate in the same direction as one another, is the same direction of rotation as that of sun wheel 2. For the translational movement of all main planet wheels 3 in an orbit, a second ring of external intermediate planet wheels 5 is arranged for transmitting the driving movement originating from the sun wheel 2 onto the stationary internal housing teeth 1. The other main planet wheels 3 also indirectly strike the internal housing teeth 1 in the direction of revolution.

During the driving of the sun wheel 2, all main planet wheels 3 consequently shift in the direction of rotation of the sun wheel 2, the main planet wheels 3 simultaneously rotate in the same direction as the direction of revolution of sun wheel 2. Planet wheels 3, 4, and 5 all have the same angular velocity with respect to the center of the planetary gear, whereas the angular velocity of sun wheel 2 is at least twice as great because of the rolling process.

In the above-described design, it will be appreciated that the path of movement of the sun wheel 2 and of the main planet wheels 3 corresponds to that of central spindle 8, which is arranged in processing chamber 12, and of screws 9. It will also be appreciated that processing chamber 12 is circular in cross section and screws 9 are arranged in a ring or circle around centrally located central spindle 8.

The following generally applies with respect to the relative velocity between the surface, or exterior, of a screw 9 and the internal housing wall or of the central spindle surface (previously denoted as "wall" in either case).

$$RG=UG+TG-WG$$

wherein, RG=relative velocity of screw/wall;

UG=circumferential velocity of the screws (due to rotation);

TG=translational velocity of the screws; and

WG=wall velocity.

Neglecting the fact in a first approximation that the diameter ratios in processing chamber 12 of the multiple-screw extruder do not need to coincide exactly with those in the gear, the following ratios approximately arise at the points of approach with the internal housing wall and the central spindle surface, when using the planetary gear according to the invention, expressed in elementary velocity units:

| Location | UG | TG | WG | RG |
| --- | --- | --- | --- | --- |
| Internal housing wall | 1 | 1 | 0 | 2 |
| Central spindle surface | −1 | 1 | 2 | −2 |

Very high relative velocities are therefore obtained at the internal wall of housing 6 and at the surface of central spindle 8 which are of the same magnitude in both cases. The essential advantage of the multiple-screw extruder with the planetary gear according to the invention resides in this fact.

In contrast to the illustration in FIG. 2, the gear may also be arranged on only one side or at one end of processing chamber 12 in the case of simple vertically. orientated multiple-screw extruders. However, the planetary gear according to the invention is preferably provided at the beginning and at the end of processing chamber 12 to achieve stable guidance of screws 9. The two planetary gears from FIG. 2 are connected to one another via central spindle 8, guaranteeing a synchronous drive for the two planetary gears. It is sufficient, however, to introduce the driving shaft only through one of the two end faces of the apparatus. A degasification dome 7 allows processing chamber 12 of the multiple-screw extruder to also be vented, and a vacuum device may preferably be attached to degasification dome 7 for discharging volatile constituents and cleavage products.

The number of closely intermeshing screws 9 in processing chamber 12 may basically be selected freely with certain restrictions. It will be appreciated that gaps between the individual screws 9 as well as gaps between screws 9 and internal housing wall and between screws 9 and central spindle 8 are kept as small as possible, but such that the individual parts do not touch one another. An appropriate planetary gear with exact design of its gear-wheels may be constructed for each application. The design of screws 9, i.e., their construction from various elements, the direction of their spiral, their pitch, their external to internal diameter ratio is basically free selected with respect to the planetary gear and is essentially based on processing factors. During production of high molecular weight products, such as polyester or polyamide by after-condensation of the melt, small screw pitches and/or single-start rather than multiple-start screws are preferably selected in the proposed multiple-screw extruder in order to obtain an adequate residence time for the increase in viscosity despite an increased conveying effect caused by the high relative velocity.

A multiple-shaft reactor according to the invention provides ideal conditions for use, for example, as a final reactor during the production of polyesters, such as polyethylene terephthalate or copolyesters based thereon with high viscosities and low acetaldehyde contents.

Generally speaking, the multiple-screw extruder according to the invention is suitable for degasification, mixing and production of all polycondensates, i.e., for polyamides, polycarbonates, polyarylates, polyamines, polyamideimides and other condensation polymers, in addition to polyesters such as polyethylene terephthalate, polybutylene terephthalate, polyethylene naphthalate.

Further applications are conceivable using the present invention for degasification (removal of solvents, monomers and oligomers), for introduction of additional gaseous or liquid components for chemical or physical changes to the medium (such as decomposition reactions or stripping), for mixing or compounding of other polymers such as polyolefins (in particular polyethylene), polystyrene (and copolymers based thereon), polymethylmethacrylate or also biopolymers (for example based on starch). Applications outside the actual plastics sphere using the present invention, for example for high-viscosity liquids or pastes in various branches of industry, are also conceivable.

The foregoing is a complete description of the present invention. The scope of the invention should only be limited by the following claims.

What is claimed is:

1. A multiple-screw extruder comprising:

a housing having an exterior surface and a circular interior surface the housing having teeth on the interior surface and an interior processing chamber; and a planetary gear having a sun wheel formed on at least one toothed portion of a spindle, a plurality of main planet wheels arranged in a circle around the sun wheel, each main planet wheel being formed on at least one end of a screw and being spaced from each other main planet wheel, from the sun wheel and from the teeth on the interior surface of the housing, a plurality of internal intermediate planet wheels arranged between the sun wheel and the main planet wheels and engaging both the sun wheel and the main planet wheels, and a plurality of external intermediate planet wheels arranged between the main planet wheels and the teeth on the interior surface of the housing and engaging both the main planet wheels and the teeth on the interior surface of the housing.

2. A multiple-screw extruder according to claim 1, wherein a number of main planet wheels, a number of internal and a number of external intermediate planet wheels are equal.

3. A multiple-screw extruder according to claim 1, wherein the sun wheel is driven.

4. A multiple-screw extruder according to claim 1, wherein the wheels of the planetary gear and the teeth on the interior surface of the housing are helical-geared.

5. A multiple-screw extruder according to claim 1, in which the wheels of the planetary gear and the teeth on the interior surface of the housing are herringbone-geared.

6. A multiple-screw extruder according to claim 1, wherein each internal intermediate planet wheel is associated with an opposing external intermediate planet wheel, a cross sectional center of the sun wheel, a cross sectional center of an internal intermediate planet wheel and a cross sectional center of the external intermediate planet wheel associated with the internal intermediate planet wheel being arranged in a radial line, a plurality of radial lines being formed for each internal intermediate planet wheel and its associated external intermediate planet wheel, and a cross sectional center of a main planet wheel being arranged on a line passing through the cross sectional center of the sun wheel and which bisects an angle formed between two adjacent radial lines.

7. A multiple-screw extruder according to claim 1, wherein the wheels of the planetary gear, the internal housing teeth and all end faces of rotating parts of the extruder are lubricated with media extruded by the multiple-screw extruder.

8. A multiple-screw extruder according to claim 1 further comprising:

a first processing chamber disposed within the interior processing chamber of the housing, the first processing chamber having an inlet end and an outlet end, a cross sectional center of the spindle arranged at a cross sectional center of the first processing chamber, the screws arranged circularly around the spindle within the first processing chamber.

9. A multiple-screw extruder according to claim 8, further comprising:

a second processing chamber disposed within the interior processing chamber of the housing, the second processing chamber having an inlet end and an outlet end, the inlet end of the second processing chamber being coupled to the outlet end of the first processing chamber;

wherein the cross sectional center of the spindle arranged at a cross sectional center of the second processing chamber, the screws arranged circularly around the spindle within the second processing chamber.

10. A multiple-screw extruder according to claim 8, wherein the planetary gear is arranged at at least one end of the first processing chamber.

11. A multiple-screw extruder according to claim 8, wherein the spindle has a smooth surface in the first processing chamber.

12. A multiple-screw extruder according to claim 8, wherein the spindle is a screw in the first processing chamber.

13. A multiple-screw extruder according to claim 8, wherein a shaft of each screw and the spindle are arranged axially in parallel.

14. A multiple-screw extruder according to claim 8, wherein adjacent screws intermesh with one another.

15. A multiple-screw extruder according claim 8, wherein a spacing between an outer periphery of each of the screws and the interior surface of the housing and a spacing between the outer periphery of each of the screws and a surface of the spindle are minimized.

16. A multiple-screw extruder according to claim 8, wherein the spindle is driven.

17. A multiple-screw extruder according to claim 8, further comprising a degasification dome arranged on the processing chamber.

18. A multiple-screw extruder according to claim 8, further comprising a vacuum device coupled to the degasification dome.

19. A method for continuously processing high-viscosity medium in a multiple-screw extruder, the multiple-screw extruder comprising a housing having an exterior surface and a circular interior surface with teeth on the interior surface, a processing chamber within the interior of the housing, the processing chamber having an inlet end and an outlet end, a planetary gear having a sun wheel formed on at least one toothed portion of a spindle, a plurality of main planet wheels arranged in a circle around the sun wheel, each main planet wheel being formed on at least one end of a screw and being spaced from each other main planet wheel, from the sun wheel and from the teeth on the interior surface of the housing, a plurality of internal intermediate planet wheels arranged between the sun wheel and the main planet wheels and engaging both the sun wheel and the main planet wheels, and a plurality of external intermediate planet wheels arranged between the main planet wheels and the teeth on the interior surface of the housing and engaging both the planet wheels and the teeth on the interior surface of the housing, a cross sectional center of the spindle being arranged at a cross sectional center of the processing chamber, the screws arranged circularly around the spindle within the processing chamber, the method comprising the steps of:

applying the high viscosity medium to the inlet end of the processing chamber;

driving the spindle for translating the main planet wheels around the sun wheel and for rotating each main planet wheel about a cross sectional center of the respective main planet wheel; and extruding the high viscosity medium from the outlet end of the processing chamber.

20. A method according to claim 19, wherein the high viscosity medium is one of a thermoplastic polymer melt or a thermoplastic polymer.

21. A method according to claim 19, wherein the high-viscosity medium in the processing chamber of the multiple-screw extruder is subjected to shearing, surface renewal and a conveying action on an internal housing wall of the processing chamber, on the spindle and between the screws.

22. A method according to claim 19, wherein the step of driving the central spindle causes the high viscosity medium on an internal housing wall of the processing chamber and on the spindle to be subjected to a high relative velocity.

23. A method according to claim 19, wherein the multi-screw extruder further comprises a degasification device coupled to the processing chamber; the method further comprising the step of degasifying the processing chamber of a volatile constituent selected from the group consisting of a monomer, an oligomer and a solvent residue.

24. A method according to claim 23, wherein the volatile constituent is a cleavage product.

25. A method according claim 21, further comprising the step of introducing one of a gaseous or liquid component to the processing chamber for causing one of a chemical or physical change in the high viscosity medium.

26. A method according to claim 25, further comprising the step of performing a chemical reaction in the processing chamber.

27. A method according to claim 25, further comprising the step of performing a mixing operation in the processing chamber.

28. A method according to claim 25, further comprising the step of performing a compounding process in the processing chamber.

29. A method according to claim 25, wherein the chemical change is a polymerization selected from the group consisting of a polycondensation and a polyaddition reaction.

30. A method according to claim 29, wherein the polycondensation reaction involves production of a polymer selected from the group consisting of a polyester, a polyamide, a polycarbonate, a polyarylate, a polyamine, a polyamideimide, and copolymers thereof.

31. A method according to claim 30, wherein the polyester is selected from the group consisting of polyethylene terephthalate, polybutylene terephythalate, polyethylene napthalate, and copolymers thereof.

* * * * *